(12) United States Patent
Scully

(10) Patent No.: US 8,166,762 B2
(45) Date of Patent: May 1, 2012

(54) FUEL CONTROL ARRANGEMENT

(75) Inventor: Mark Scully, Derby (GB)

(73) Assignee: Rolls-Royce PLC, London (GB)

( * ) Notice: Subject to any disclaimer, the term of this patent is extended or adjusted under 35 U.S.C. 154(b) by 400 days.

(21) Appl. No.: 12/453,761

(22) Filed: May 21, 2009

(65) Prior Publication Data

US 2009/0320480 A1    Dec. 31, 2009

(30) Foreign Application Priority Data

Jun. 26, 2008  (GB) .................................. 0811647.7

(51) Int. Cl.
*F02C 1/00*  (2006.01)

(52) U.S. Cl. ........................................ 60/734; 60/39.281

(58) Field of Classification Search .............. 60/39.281, 60/734, 739, 740, 746
See application file for complete search history.

(56) References Cited

U.S. PATENT DOCUMENTS

| 4,854,127 A | 8/1989 | Vinson et al. | |
|---|---|---|---|
| 4,984,424 A * | 1/1991 | Shekleton | 60/39.094 |
| 5,881,550 A * | 3/1999 | Toelle | 60/39.094 |
| 6,955,040 B1 | 10/2005 | Myers, Jr. et al. | |
| 7,036,302 B2 | 5/2006 | Myers Jr. et al. | |
| 2005/0217269 A1* | 10/2005 | Myers et al. | 60/739 |
| 2007/0130911 A1* | 6/2007 | Goldberg et al. | 60/39.281 |
| 2008/0271456 A1* | 11/2008 | Scully et al. | 60/740 |
| 2009/0241510 A1* | 10/2009 | Gallagher et al. | 60/39.281 |

FOREIGN PATENT DOCUMENTS

| EP | 1 965 054 A2 | 9/2008 |
|---|---|---|
| JP | A-07-054671 | 2/1995 |

* cited by examiner

*Primary Examiner* — Louis Casaregola
*Assistant Examiner* — Phutthiwat Wongwian
(74) *Attorney, Agent, or Firm* — Oliff & Berridge, PLC

(57) ABSTRACT

Fuel control arrangements provide and control fuel flow to injectors through fuel control valves. The injectors are connected to respective fuel control valves which in turn are connected to a first fuel flow path. The injectors are also connected to a second fuel flow path. The fuel paths are associated with a fuel source and generally have a recirculation valve between them. When flow in the flow path is stopped, recirculation of fuel can be provided across the recirculation valve to prevent fuel degradation. By provision of a restrictor valve in the second fuel flow path control of fuel recirculation can be achieved, as well as greater flexibility by presenting fuel flow separately through the second flow path to the injector whilst the first flow path is inhibited.

14 Claims, 2 Drawing Sheets

FUEL CONTROL ARRANGEMENT

BACKGROUND

The present invention relates to fuel control arrangements and more particularly to fuel control arrangements utilised in gas turbine engines.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor 13 compresses the airflow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts 26, 28, 30.

Delivery of fuel within a gas turbine engine is important for achieving operational performance. A number of processes have been utilised in the past to control fuel supply within a gas turbine engine. Mechanical systems use rods and/or a unison ring to distribute and control displacement of fuel valves driven from a remote input drive system which is generally fuel pressure controlled typically using fueldraulic servo-activators. Such mechanical systems suffer since care must be taken with physical alignment and use of appropriate bearings, and thermal growth in the rods and unison ring must be considered. It will also be understood that a relatively large number of external dynamic seals are required for the system. Such seals present considerable fire and reliability problems.

More recently hydraulic control systems using pilot pressure to distribute control of fuel through fuel valves have been proposed. U.S. Pat. No. 6,955,040 and U.S. Pat. No. 7,036,302 provide examples of such hydraulically controlled fuel control arrangements and systems. Unfortunately such hydraulically controlled fuel control systems require considerable additional fuel lines and supplies along with wasted flow dynamics to produce the necessary thermal pressure control and to attempt to reduce lacquering of stagnated fuel or temperature damage to slowly moving fuel. Insufficient control of fuel lacquering can lead to valve functional defects. Furthermore, as there are no mechanical interconnections between the fuel valves at each fuel injector it is difficult to achieve the safety and reliability requirements for a convenient yet fully acceptable system.

A further prior approach to fuel control arrangements relates to utilisation of flexible drive actuation processes to control individual fuel valves by a remote drive system. Such flexible drive actuation systems have advantages but it will be understood that the control devices are located at the fuel injector and so in extremely high temperature environments about an engine core. These environmental considerations do not lend themselves to sensing actual or accurate fuel valve positions and therefore, through feedback control loops, adjusting necessary valve position for fuel requirements and demand. Furthermore there are system problems, typically in relation to assembly and rigging, in ensuring that the assembly is correctly aligned for desired functionality.

SUMMARY

It is desirable to provide better regulation and control of fuel presentation to fuel injectors between first or main fuel paths and second or pilot fuel paths. However, such control is limited by the relatively hot environment adjacent the fuel injectors and a desire to avoid stagnation and therefore degradation of fuel within the fuel paths.

In accordance with aspects of the present invention there is provided a fuel control arrangement comprising a first flow path and a second flow path each coupled to a fuel injector and a common fuel source, the arrangement further comprising a fuel control valve connected between the first and second flow paths and coupled to the fuel injector, the second flow path having a restrictor valve to control the flow of fuel in the second flow path, the restrictor valve connected to a controller and the controller providing a control signal to the restrictor valve to vary the proportion of fuel distributed between the first flow path and the second flow path.

Typically, the first and the second flow path define a flow circuit incorporating the fuel injector. Generally, the flow circuit incorporates a recirculation valve.

Generally, the control signal is a fluid pressure presented to the restrictor valve. Typically, the fluid pressure is pneumatic.

Typically, the first and the second flow path respectively define a first fuel manifold and a second fuel manifold.

Generally, there is a plurality of fuel control valves and respective fuel injectors.

Generally, the fuel control valve is coupled to a fuel pressure manifold to act with fuel pressure in at least one of the first and second flow paths to regulate operation of the fuel control valve. Generally, the recirculation valve is coupled to a fuel pressure manifold whereby fuel pressure in the fuel pressure manifold regulates operation of the recirculation valve.

Generally, a controller is provided in a distinct temperature environment from at least one of the injector and the fuel control valve.

Further in accordance with aspects of the present invention there is provided a method of operating a fuel control arrangement comprising a fuel injector connected between first and second flow paths, the method comprising providing a fuel control valve conneted between the first and second flow paths and coupled to the fuel injector, restricting fuel flow in one of the flow paths to vary the proportion of fuel distributed between the first and second flow paths.

BRIEF DESCRIPTION OF THE DRAWINGS

Aspects of the present invention will now be described by way of example and reference to the accompanying drawings in which.

DETAILED DESCRIPTION OF EMBODIMENTS

A typical multi nozzle, multi stage fuel injection system provides fuel flow to fuel injectors from respective fuel manifolds for a first or main fuel flow path and a second or pilot fuel flow path. The first and the second fuel paths are separately connected to the fuel injector with a fuel control valve normally associated with the first flow path. The fuel control valve is actuated or regulated by fuel pressure taken from a fuel pressure servo manifold indicative of fuel demand requirements at the injector. The second or pilot fuel flow path is associated directly with a separate injector. Fuel flow through the first flow path and the second flow path can be utilised to regulate the flow through the injector. Conventionally prior fuel arrangements have provided for flow control under fuel pressure only with respect to the first flow path. By aspects of the present invention flow control is provided with respect to fuel flow in both the first fuel flow and in the second fuel flow path.

Figure 1:
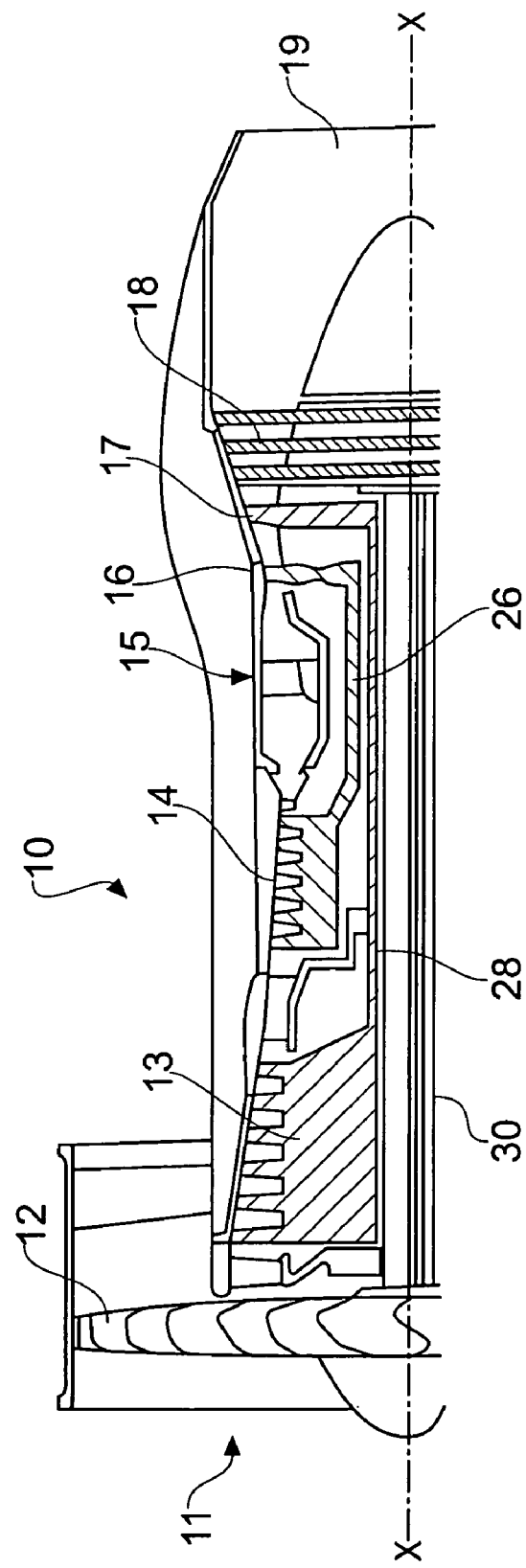
FIG. 1 is a schematic illustration of a gas turbine engine.
Figure 2:
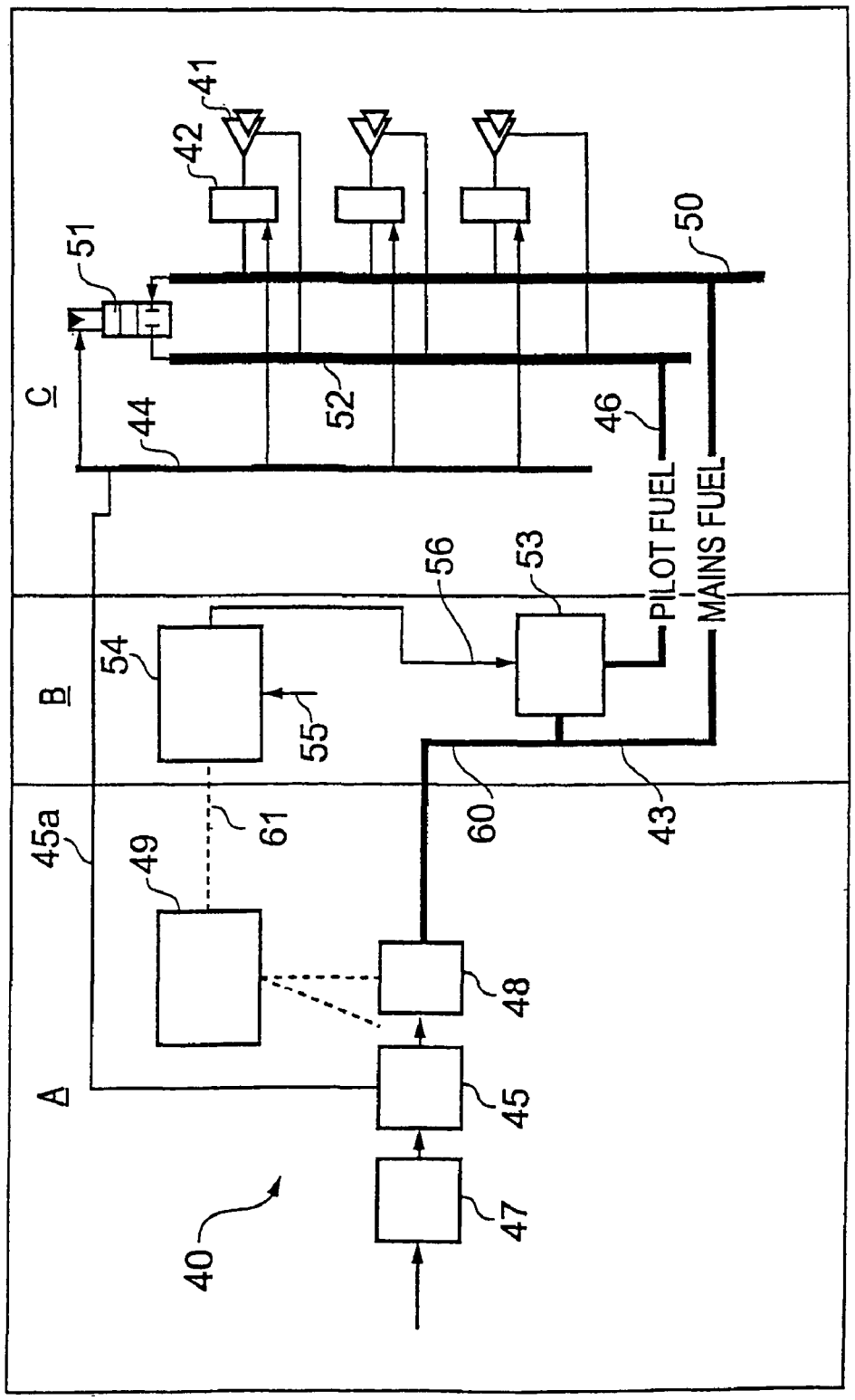
FIG. 2 is a schematic illustration of a fuel arrangement in accordance with aspects of the present invention.

Referring to FIG. 2 a fuel control arrangement 40 includes fuel injectors 41 and fuel control valves 42. Each fuel control valve 42 is associated with a main or first flow path 43 and is regulated and actuated from a fuel servo manifold 44 which in turn receives fuel pressure as a signal from a regulator 45 via a signal line 45*a*.

A second or pilot fuel flow path 46 is directly connected with the injector 41. As shown in FIG. 2, generally there are a number of fuel injectors 41 and control valves 42 in a fuel control arrangement 40 in accordance with the present invention. The first flow path 43 and the second flow path 46 are connected to a fuel source generally comprising a pump 47 and a flow meter 48. The flow meter 48 is electrically coupled to a controller 49 in order that fuel demands can be communicated to the meter 48 to be met by fuel flow via the injectors 41. Control signals are sent to the flow meter 48 in order that fuel is directed to the first flow path 43 and the second flow path 46. Fuel directed to the first flow path 43 passes along that path and into a first fuel manifold 50. Dependant upon the fuel servo pressure signal presented to the fuel servo manifold 44, the valve 42 is operated in order to allow fuel to pass to the injector 41.

The first flow path 43 and the second flow path 46 are coupled via a recirculation valve 51 to form a flow circuit. When the valve 51 is open, fuel recirculates through the manifold 50 into a second fuel manifold 52 which is part of the second fuel flow path 46. When the recirculation valve 51 is closed, fuel does not pass through the valve 51 and therefore there is no communication between the first fuel manifold 50 and the second fuel manifold 52.

Generally, the first flow path 43 and the second flow path 46 are separately connected to the injector 41. The present invention further provides a restrictor valve 53 in the second flow path 46.

The restrictor valve 53 is generally a two position valve located remotely from the fuel injectors 41 meaning less problematic control of the valve 53 can be achieved. It will be understood that zone A is a relatively benign and cool location remote from the injectors 41. Zone A will typically be within and near a fan casing for a gas turbine engine. Zone C is adjacent to the combustor and therefore is relatively hot. In such an environment, sensors and valve operation may be susceptible to the harsh conditions. By locating a restrictor valve 53 at an intermediate zone B more consistent operation of the valve 53 may be achieved.

By use of the restrictor valve 53 fuel supply through the second flow path 46, and second fuel manifold 52, is directed to each injector 41. Such an arrangement allows the distribution of fuel between the first flow path 43 and the second flow path 46 to be more easily changed and proportionately split.

The restrictor valve 53 receives a control signal 61 that is generated by controller 49 from a solenoid distributor 54 coupled to the controller 49. The restrictor valve 53 is controlled pneumatically with a fluid pressure, typically a high pressure fluid, such as pneumatic or other driver mechanism 55, generated through the distributor 54 based upon control signals from the controller 49. The controller 49 indicates fuel demand requirements at the injector 41 to the distributor 54, which in turn appropriately sets the restrictor valve 53.

It will be understood that a single restrictor valve 53 can be utilised in the second flow path 46 and manifold 52 to control fuel flow to the injectors 41. Alternatively, individual restrictor valves 53 and an associated second flow path 46 can be utilised to enable individual injectors 41 to be addressed and set appropriately.

Typically, the restrictor 53 is in a benign environment compared to zone C which improves its operation. Conventional feedback devices can be used with the restrictor valve 53 allowing more consistent direction of fuel through the second flow path 46 to the injector 41.

When utilising a pneumatic restrictor valve 53 the air supply to the valve 53 can also be used as a drain path for fuel leaks from the valve 53. Fuel leaking into the air supply pipe 56 from the valve 53 can be drained from the pipe 56 through a vent hole. The pneumatic pressure control system to the valve 53 is preferably arranged to ensure a small continual air flow to purge fuel leaks to the tell tale vent hole. The temperature of the pressurised air utilised to activate the valve 53, as well as the fuel control valve 42, will be designed such that they do not contribute to thermal degradation of the fuel.

Fuel degradation occurs when fuel is stagnant or slow flowing within the flow circuit comprising the first flow path 43, the second flow path 46 and the injector 41. By the additional choices provided by the restrictor valve 53 it is easier to specifically continue fuel flow through the circuit defined by the paths 43, 46. Prior arrangements utilising a recirculation valve 53 as indicated above, depended on the fuel servo pressure provided in the manifold 44. The servo pressure itself is a result of fuel pressure presented to the manifold 44. This fuel pressure may be susceptible to fuel degradation and therefore spurious operation.

Each injector 41 is supplied with fuel from the first flow path 43 through a multi-position fuel pressure controlled actuator, the fuel control valve 42. Each valve 42 provides three possible flow states, that is to say on, partial flow or off. Normally each valve 42 is moved as a function of the fuel pressure applied via a fuel servo line, signal line 45*a*, to the manifold 44. In order to modify flow distribution to the combustor, the valves 42 are configured to operate at different fuel servo pressure levels so each opens at those distinct pressures rather than all the valves 42 having the same value. In any event, design and manufacturing tolerances mean each injector 41 will typically operate at a slightly different crack opening pressure and therefore the fuel servo pressure presented through the manifold 44 will be designed to provide a pressure consistent with the highest crack opening pressure for all injectors 41.

To avoid the effects of fuel thermal degradation, when all of the main fuel injectors 41 are switched off that is to say with no flow through them, a further actuated fuel recirculation valve 51 is connected to define the flow circuit to the second flow path 46. When the recirculation valve 51 is closed, fuel will not flow into the second fuel manifold 52 and therefore will not flow to the injector 41 from the manifold 52. However, when the valve 42 is closed and recirculation is required to avoid fuel degradation, the second fuel manifold 52 will receive fuel flow. If the pilot restrictor valve 53 is closed, pressure will be presented within the second fuel manifold 52 and this may result in fuel flow through the injector 41 dependant upon the position of the recirculation valve 51. This recirculation valve 51 operates in accordance with fuel pressure provided in the manifold 44 and so provides regulation based on the fuel pressure in the manifold 52 which can then be utilised for achieving fuel flow through the injector 41.

If the restrictor valve 53 is open then it will be appreciated that pressure generated within the second fuel manifold 52 will be degraded or diminished, with fuel pressure balanced across the recirculation valve 51 either side of the fuel circuit defined by the first flow path 43 and the second flow path 46. Fuel will generally still recirculate through the paths 43, 46 to avoid fuel degradation.

By use of the restrictor valve 53 it will be appreciated that greater control of fuel distribution to the injectors 41 can be achieved. The arrangement allows a distributed staged fuel control arrangement 40 in which multiple fuel control valves 42 are controlled by utilising a restrictor valve 53. The restrictor valve 53 can be positioned in a relatively benign temperature environment, distinct from the injectors 41 and fuel control valves 42. Thus the restrictor valve 53 can utilise position feedback sensors with more reliability.

The arrangement of the present invention means fewer control elements are necessary in comparison with prior art arrangements, in that a single restrictor valve 53 can provide the functionality and be located at a more benign location. It will be appreciated that prior art arrangements have individual control valves at each fuel injector which adds significantly to operational control requirements, cost and weight.

By utilisation of a pressurised fluid such as the pneumatic control signal it will be understood that operation of the restrictor valve 53 is less susceptible to fuel thermal degradation effects.

Using fuel control pressure as the actuator regulator for the fuel control valve 42 allows either fully modulated or discrete control to be more readily achieved.

Modifications and alterations within the scope of the present invention will be understood by people skilled in the technology. Thus, a restrictor valve 53 may be operated solely in the flow circuit defined by the paths 43, 46 to varying flow through the recirculation path to avoid fuel degradation. Alternatively, the restrictor valve 53 may allow separate fuel flow through the second flow path 46 from the common fuel source 60 to the injector 41 whilst fuel flow through the control valve 42 is prevented by closure of that valve 42. Fuller flexibility in operational control of fuel flow to the injectors 41 can thus be achieved.

The invention claimed is:

1. A fuel control arrangement comprising:
    a first flow path;
    a second flow path;
    a common fuel source;
    a fuel injector, the first flow path and the second flow path each being coupled to: i) the common fuel source, and ii) the fuel injector;
    a fuel control valve that is: i) connected between the first flow path and the second flow path, and ii) coupled to the fuel injector;
    a controller; and
    a restrictor valve that is: i) disposed on the second flow path, ii) configured to control the flow of fuel in the second flow path, iii) connected to the controller, and iv) located in a distinct temperature environment other than the fuel infector and the fuel control valve;
    the controller being configured to control the restrictor valve to vary a proportion of fuel distributed between the first flow path and the second flow path.

2. The fuel control arrangement as claimed in claim 1 wherein the first flow path and the second flow path define a flow circuit incorporating the fuel injector.

3. The fuel control arrangement as claimed in claim 2 wherein the flow circuit incorporates a recirculation valve.

4. The fuel control arrangement as claimed in claim 1 wherein the controller controls the restrictor valve in accordance with a control signal that corresponds to a fluid pressure presented to the restrictor valve.

5. The fuel control arrangement as claimed in claim 4 wherein the fluid pressure is generated using a pneumatic mechanism.

6. The fuel control arrangement as claimed in claim 1 wherein the first flow path and the second flow path respectively define a first fuel manifold and a second fuel manifold.

7. The fuel control arrangement as claimed in claim 1 further comprising:
    a plurality of fuel control valves and respective fuel injectors.

8. The fuel control arrangement as claimed in claim 1, further comprising:
    a fuel pressure manifold, wherein
        the fuel control valve is coupled to the fuel pressure manifold to use fuel pressure in at least one of the first flow path and the second flow path to regulate operation of the fuel control valve.

9. The fuel control arrangement as claimed in claim 3, further comprising:
    a fuel pressure manifold, wherein
        the recirculation valve is coupled to the fuel pressure manifold whereby fuel pressure in the fuel pressure manifold regulates operation of the recirculation valve.

10. The fuel control arrangement as claimed in claim 1 wherein the controller is provided in a distinct temperature environment from at least one of the fuel injector and the fuel control valve.

11. The fuel control arrangement as claimed in claim 2 wherein the controller controls the restrictor valve in accordance with a control signal that corresponds to a fluid pressure presented to the restrictor valve.

12. The fuel control arrangement as claimed in claim 11 wherein the fluid pressure is generated using a pneumatic mechanism.

13. The fuel control arrangement as claimed in claim 1, further comprising:
    a solenoid distributor that is coupled to the restrictor valve using an air supply pipe.

14. The fuel control arrangement as claimed in claim 1, wherein,
    the restrictor valve uses the solenoid distributor to vary a proportion of fuel distributed between the first flow path and the second flow path.

\* \* \* \* \*